US009535185B2

(12) United States Patent
Olson et al.

(10) Patent No.: US 9,535,185 B2
(45) Date of Patent: Jan. 3, 2017

(54) FAILURE POINT DIAGNOSTICS IN CABLE TELEMETRY

(71) Applicant: Schlumberger Technology Corporation, Sugar Land, TX (US)

(72) Inventors: Alex Olson, Houston, TX (US); Nalin Weerasinghe, Sagamihara (JP); Milos Milosevic, Houston, TX (US); Kun Wang, Sugar Land, TX (US); Motohiro Nakanouchi, Hachioji (JP); Kenji Endo, Sagamihara (JP); Yuichi Kobayashi, Machida (JP); Hiromasa Nishisaka, Sagamihara (JP)

(73) Assignee: Schlumberger technology Corporation, Sugar Land, TX (US)

( * ) Notice: Subject to any disclaimer, the term of this patent is extended or adjusted under 35 U.S.C. 154(b) by 367 days.

(21) Appl. No.: 13/705,124

(22) Filed: Dec. 4, 2012

(65) Prior Publication Data

US 2014/0152456 A1 Jun. 5, 2014

(51) Int. Cl.
*G01V 3/00* (2006.01)
*G01V 3/18* (2006.01)
*E21B 47/12* (2012.01)

(52) U.S. Cl.
CPC ............ *G01V 3/18* (2013.01); *E21B 47/12* (2013.01)

(58) Field of Classification Search
CPC ...... E21B 47/12; E21B 47/122; E21B 17/028; E21B 44/00; E21B 47/14; E21B 17/003; E21B 47/00; E21B 47/16; E21B 47/18; E21B 7/046; E21B 47/01; E21B 47/06; E21B 47/182; E21B 41/0085; E21B 47/02224

(Continued)

(56) References Cited

U.S. PATENT DOCUMENTS

| 4,597,073 A | 6/1986 | Staples |
| 4,905,234 A | 2/1990 | Childress et al. |

(Continued)

FOREIGN PATENT DOCUMENTS

| GB | 2393364 | 3/2004 |
| GB | 2408432 | 5/2005 |

(Continued)

OTHER PUBLICATIONS

Gardner, W.R., Goodman, K.R., "An Adaptive Telemetry System for Hostile Environment Well Logging", SPE # 25013, 1992, pp. 531-540.

(Continued)

*Primary Examiner* — Brian Zimmerman
*Assistant Examiner* — Thomas McCormack
(74) *Attorney, Agent, or Firm* — Daryl R. Wright; Jody Lynn DeStefani (57) ABSTRACT

Methods and systems for failure point diagnostics in cable telemetry at a wellsite. The methods involve providing a system includes a cable operatively coupling between a surface modem and a downhole modem that is operatively coupled to a downhole toolstring of one or more downhole tools via a toolbus. The methods further involve generating a plurality of test signals, sequentially applying the test signals across one or more test loops in the cable telemetry system, and generating a failure point alert when at least one of the test signals fails in at least one of the test loops. The failure point alert identifies which component of the cable telemetry system caused the test signal to fail.

6 Claims, 10 Drawing Sheets

(58) Field of Classification Search
USPC ..... 340/853.2, 870.04; 73/168; 714/712–717
See application file for complete search history.

(56) References Cited

U.S. PATENT DOCUMENTS

| | | | |
|---|---|---|---|
| 5,191,326 A | | 3/1993 | Montgomery |
| 5,331,318 A | | 7/1994 | Montgomery |
| 5,592,438 A | | 1/1997 | Rorden et al. |
| 5,719,883 A | | 2/1998 | Ayanoglu |
| 5,784,004 A | | 7/1998 | Esfahani et al. |
| 5,825,849 A | * | 10/1998 | Garland et al. ............ 379/22.01 |
| 5,838,727 A | | 11/1998 | Lyon et al. |
| 5,995,449 A | | 11/1999 | Green et al. |
| 6,061,633 A | | 5/2000 | Fukuhara et al. |
| 6,175,599 B1 | | 1/2001 | Lyon et al. |
| 6,252,518 B1 | | 6/2001 | Laborde |
| 6,310,559 B1 | | 10/2001 | Laborde et al. |
| 6,519,568 B1 | | 2/2003 | Harvey et al. |
| 6,552,665 B1 | | 4/2003 | Miyamae et al. |
| 6,580,751 B1 | | 6/2003 | Gardner et al. |
| 6,628,992 B2 | | 9/2003 | Osburn, III |
| 6,657,551 B2 | | 12/2003 | Huckaba et al. |
| 6,747,569 B2 | | 6/2004 | Hill et al. |
| 6,999,517 B1 | | 2/2006 | Bombay et al. |
| 7,026,952 B2 | | 4/2006 | Krueger |
| 7,042,367 B2 | | 5/2006 | Gardner et al. |
| 7,081,831 B2 | | 7/2006 | Dodge |
| 7,096,961 B2 | | 8/2006 | Clark et al. |
| 7,132,958 B2 | | 11/2006 | Dodge et al. |
| 7,181,515 B2 | | 2/2007 | Lin et al. |
| 7,193,525 B2 | | 3/2007 | Miyamae et al. |
| 7,394,752 B2 | | 7/2008 | Hasegawa et al. |
| 7,443,312 B2 | | 10/2008 | Quintero et al. |
| 7,480,207 B2 | | 1/2009 | Marsh |
| 7,787,525 B1 | | 8/2010 | Clark, Jr. et al. |
| 8,217,802 B2 | | 7/2012 | Weerasinghe |
| 2002/0178295 A1 | | 11/2002 | Buczek et al. |
| 2004/0155794 A1 | | 8/2004 | Gardner |
| 2004/0156264 A1 | | 8/2004 | Gardner et al. |
| 2004/0217880 A1 | * | 11/2004 | Clark ................... E21B 47/12 340/854.9 |
| 2005/0046592 A1 | | 3/2005 | Cooper et al. |
| 2006/0075276 A1 | * | 4/2006 | Kataria ................ G06F 8/65 714/47.1 |
| 2006/0143234 A1 | * | 6/2006 | Beeson ................ G01V 11/002 |
| 2009/0083000 A1 | * | 3/2009 | Sherman ............... G06Q 30/06 702/184 |
| 2010/0194586 A1 | * | 8/2010 | Tjhang ................ G01V 11/002 340/854.7 |
| 2010/0295702 A1 | | 11/2010 | Zhao et al. |
| 2011/0005835 A1 | | 1/2011 | Li |
| 2014/0152459 A1 | | 6/2014 | Olson et al. |

FOREIGN PATENT DOCUMENTS

| | | |
|---|---|---|
| WO | 0195517 | 12/2001 |
| WO | 2008005054 | 1/2008 |

OTHER PUBLICATIONS

Office Action issued in related MX Application No. MX/a/2013/014182 mailed Jul. 10, 2015, with partial English translation by Agent (5 pages).

Notice of Allowance issued in related MX Application No. MX/a/2013/014182 mailed Dec. 15, 2015, with partial English translation by Agent (2 pages).

* cited by examiner

FAILURE POINT DIAGNOSTICS IN CABLE TELEMETRY

BACKGROUND

The following descriptions and examples are not admitted to be prior art by virtue of their inclusion in this section.

Hydrocarbon fluids, such as oil and natural gas, may be obtained from a subterranean geologic formation, referred to as a reservoir, by drilling a well that penetrates a hydrocarbon-bearing formation. A variety of downhole tools may be used in various areas of oil and natural gas services. In some cases, downhole tools may be used in a well for surveying, drilling, and production of hydrocarbons. The downhole tools may communicate with the surface via various telemetry systems. In some cases, the downhole tools may comprise one or more individual modules in operative communication with one another, such as a master module and multiple slave modules. Examples of communication systems are provided in U.S. Pat. Nos. 6,628,992, 7,181,515, and 20020178295.

With the increased precision of downhole tools and sensors, relatively shorter time may be available to send increasingly larger amounts of data. In addition to new modules and assemblies being developed for downhole use on a continuing basis, tool bus systems may facilitate communication between older and newer generation modules in order to obtain the maximum service life from existing modules.

Applications of disclosed embodiments of the present disclosure are not limited to these illustrated examples, different industrial applications may benefit from implementations of the following disclosure.

SUMMARY

In at least one aspect, the disclosure relates to a method for failure point diagnostics in cable telemetry. The method can include providing a cable telemetry system including a cable operatively coupling between a surface modem and a downhole modem that is operatively coupled to a downhole toolstring of one or more downhole tools via a toolbus. The method can include generating a plurality of test signals. The method can include sequentially applying the test signals across one or more test loops in the cable telemetry system. The method can include generating a failure point alert when at least one of the test signals fails in at least one of the test loops, where the failure point alert identifies which component of the cable telemetry system caused the test signal failure.

In at least one aspect, the disclosure relates to a system for failure point diagnostics in cable telemetry. The system can include a cable defining a first round trip test loop, operatively coupling between a surface modem and a downhole modem. The surface modem can include a first internal test loop. The downhole modem can include a second internal test loop. The downhole modem may be operatively coupled to a downhole toolstring of one or more downhole tools via a toolbus defining a second round trip test loop. The system can also include a surface computer, operatively coupled to the surface modem, that generates a plurality of surface test signals. The system can also include a surface acquisition front end, operatively coupled to the surface computer, that includes a third internal test loop. The surface computer may be configured to sequentially apply the test signals across the test loops; and generate a failure point alert when at least one of the test signals fails in at least one of the test loops identifying which component of the cable telemetry system caused the test signal failure.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for failure point diagnostics in cable telemetry are described with reference to the following figures. Like numbers are used throughout the figures to reference like features and components.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to system, apparatus, and method for failure point diagnostics in cable telemetry to aid in trouble-shooting. Each component, from surface to downhole, may be tested separately to detect the origin and type of failure, and failures can be identified, both in real time and/or in a log for later analysis. The diagnostics may occur automatically, for example, in an initial auto-diagnose phase, as well as at the direction of a user in successive diagnostic sessions.

The failure diagnostics may be applied as self-tests, with test signals generated in loops internal to each component, as well as test loops across round trips (e.g., over the cable and/or toolbus). The failure diagnostics may narrow the source of a problem down to a particular tool or component, or in the case of self-tests, even to multi-chip modules within a single component. With this information, a faulty component can be replaced or repaired.

"Uplink" may be used to generally refer to any communication transferring data from a downhole tool to the surface. "Downlink" may be used to generally refer to any communication of command or data from the surface to one or more downhole tools. Communication between downhole tools is termed "inter-tool" communication herein and includes communication between downhole tools without traveling to and from a surface module as done previously.

Failure Point Diagnostics in Cable Telemetry Overview

Figure 1:
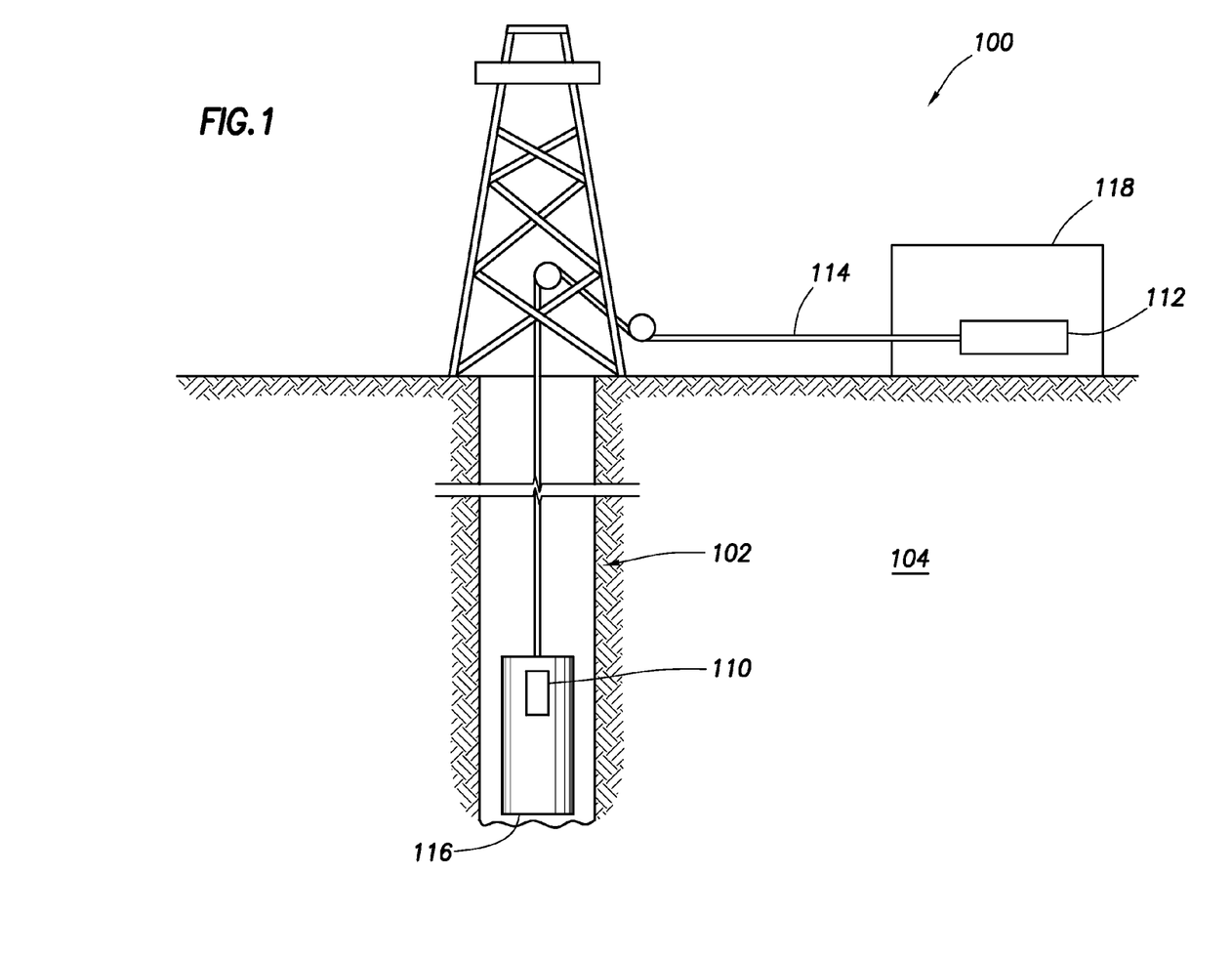
FIG. 1 is a schematic representation illustrating a wellsite with a borehole traversing a subsurface formation and having a toolstring with a cable telemetry system deployed therein in accordance with an embodiment of the present disclosure.

Referring to FIG. 1, an example wireline logging operation is illustrated with respect to the wellsite system 100 employed in a wellbore 102 traversing a subsurface formation 104. A downhole telemetry cartridge 110 is connected to a toolstring 116. In a well-logging operation, a plurality of tools (e.g., 230, 230', etc. of FIG. 2) may be connected in the toolstring 116. The tools of the toolstring 116 communicate with the downhole telemetry circuits of downhole telemetry cartridge 110 via a bidirectional electrical interface.

In some embodiments, the tools of the toolstring 116 may be connected to the telemetry cartridge 110 over a common data bus. In some embodiments, each tool of the toolstring 116 may be individually, directly connected to the telemetry cartridge 110. In one embodiment, the telemetry cartridge 110 may be a separate unit, which is mechanically and electrically connected to the tools in the toolstring 116. In one embodiment, the telemetry cartridge 110 may be integrated into a housing of one of the well-logging tools 116.

The telemetry cartridge 110 is operatively coupled to a wireline cable 114. The tools of the toolstring 116, including the telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The acquisition computer 118 may communicate with the uphole telemetry unit 112 via a bidirectional electrical interface.

The uphole telemetry unit 112 may modulate downlink commands from the acquisition computer 118 for transmission down the cable 114 to the toolstring 116, and demodulates uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and to demodulate downlink commands or data from the surface data acquisition computer 118 for the tools of the toolstring 116.

Figure 2:
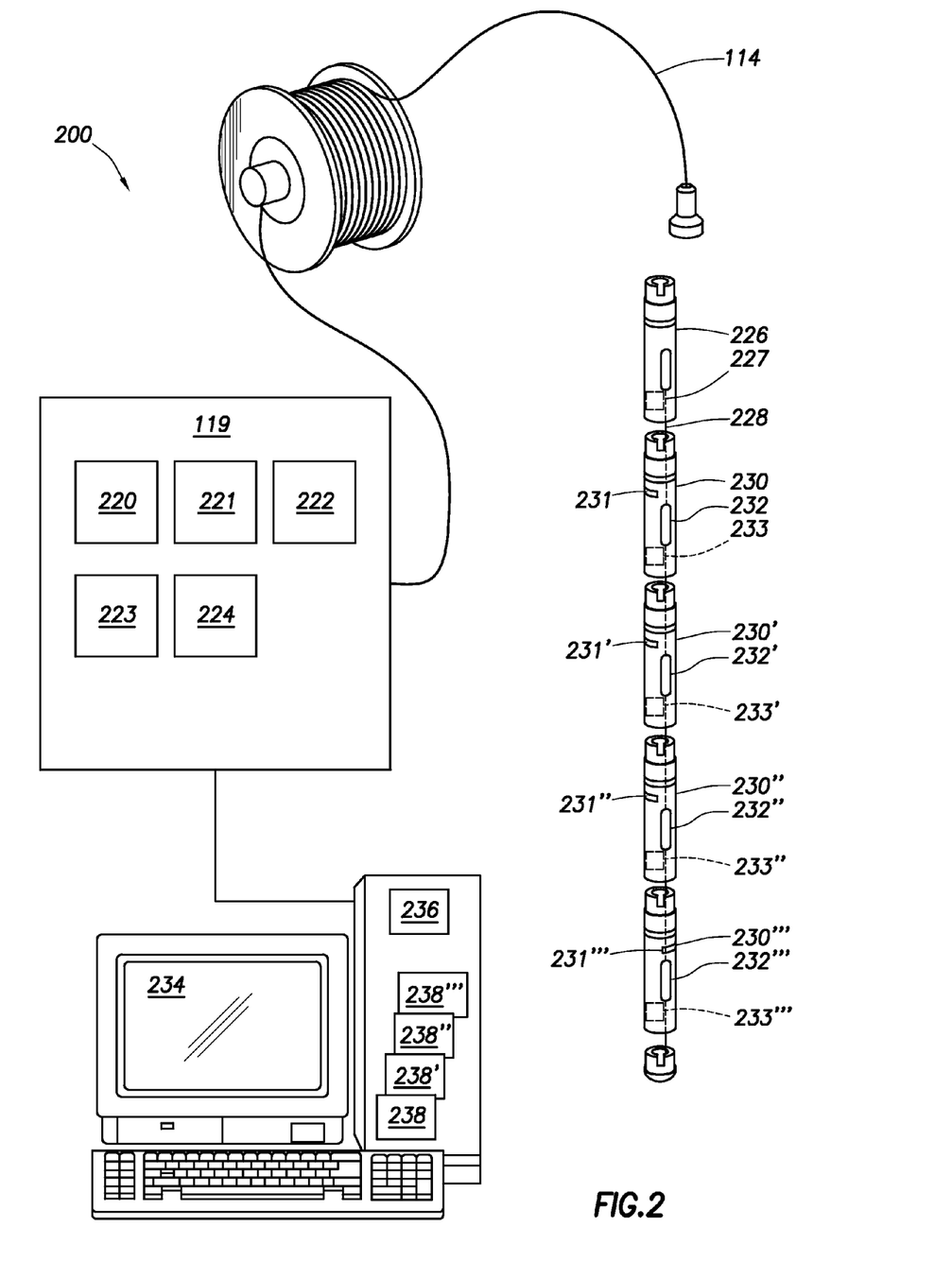
FIG. 2 shows a block diagram illustrating an example cable telemetry system in accordance with an embodiment of the present disclosure.

A more detailed schematic view of an example cable telemetry system 200 is shown in FIG. 2. The cable telemetry system 200 shown includes a surface acquisition module/surface modem (DTM) 220 having a telemetry interface module (TIM) 222, which can be located at the surface as a portion of or operatively coupled to the surface data acquisition front end 119 (a component of surface data acquisition computer 118 of FIG. 1). The front end 119 may be, for example, enhanced Wireline Acquisition Front End (eWAFE™) commercially available from SCHLUMBERGER™ (see: www.slb.com).

The surface data acquisition front end 119 is coupled to the wireline cable 114, and a downhole modem (DTC) 226 (as a portion of the downhole telemetry cartridge 110 at the head of the toolstring 116 of FIG. 1). The tool string 116 includes a number of downhole tools, 230, 230', 230", 230''', etc. The downhole tools 230, 230', etc., each containing a respective interface package, 232, 232', 232", 232''', etc., through which they are in communication with the DTC 226 via a tool bus 228. The downhole tools 230, 230', 230", 230''', etc. may also have tool node controllers 233, 233', 233", 233''', etc., respectively.

The cable telemetry system 200 may handle data flows in opposite directions (i.e., from the tools 230, 230', etc.) via the respective node and the tool bus 228. The flow extends to the DTC 226 to the DTM 220 over the cable 114 ("uplink"), and the reverse direction from the DTM 220 to the DTC 226 and tools 230, 230', etc., over the same path ("downlink"). The cable telemetry system 200 provides a communication path from the tools, 230, 230', etc., to the DTM 220 of the data acquisition computer 118 so that data acquired by sensors 231, 231', 231", 231''', etc. of the downhole tools, 230, 230', etc., can be processed and analyzed at the surface, as well as communication between tools 230, 230', etc.

Each individual tool (230, 230', etc.) may include a node command buffer (not shown) at the interface package 232, 232', etc., as well as a logic controller of its own (not shown). The surface acquisition front-end unit 119 may also include various additional components, such as a power module 221, a depth and tension module 223, and a flow controller software module (FEPC) 224.

The downhole telemetry cartridge 226 can include a downhole master node controller 227 that may examine packets sent by each respective tool 230, 230', etc. Data communicated in either direction may be copied and buffered at the master node controller 227, and sent to the recipient.

A surface computer 234 can store and execute a surface data dispatcher module 236 (which may be, in an embodiment, a software data routing module, such as SCHLUMBERGER's™ MAXWELL™ framework). The surface computer 234 can also store and execute a plurality of surface tool-specific applications 238, 238', 238", 238''', etc. that analyze and use data obtained, respectively, by tools 230, 230', etc.

Figure 3:
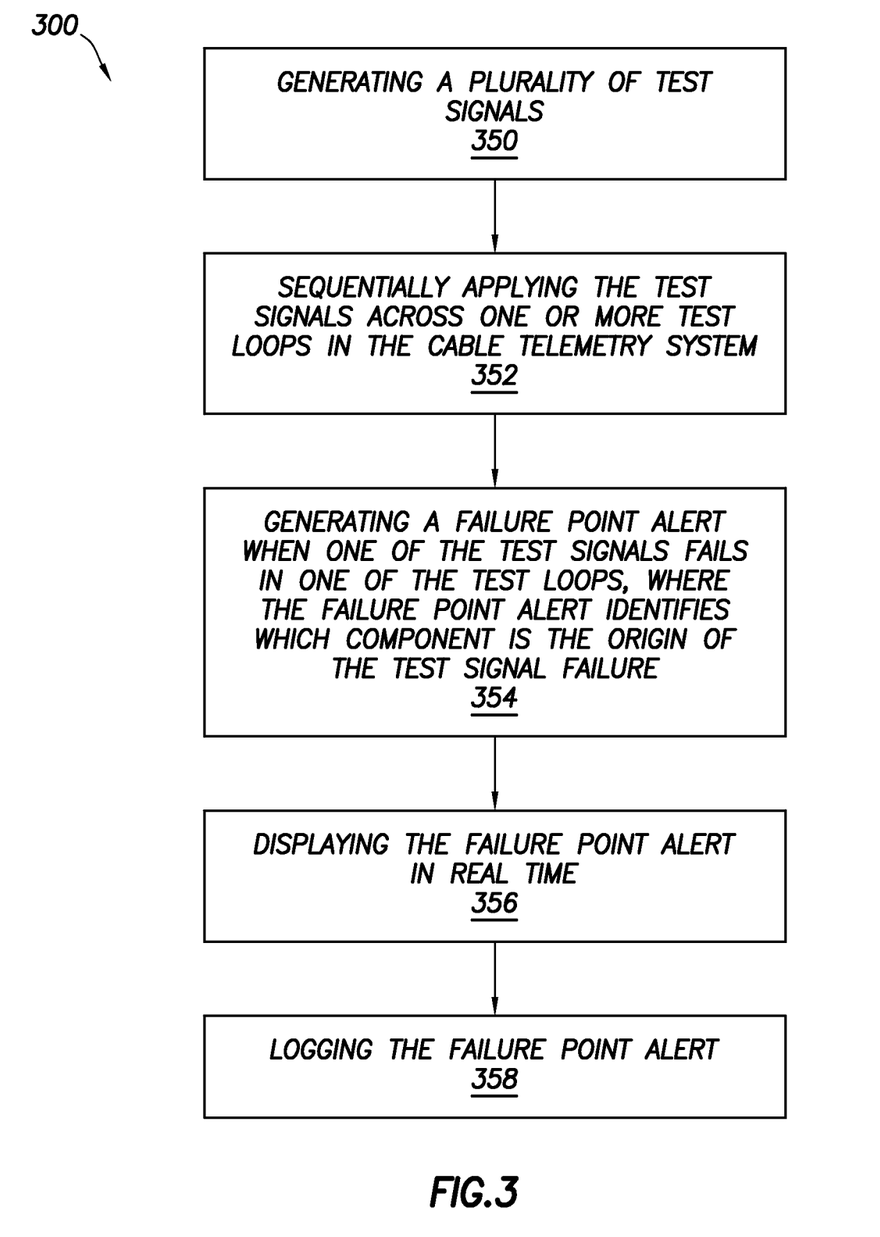
FIG. 3 is a flowchart illustrating a method for failure point diagnostics in a cable telemetry system in accordance with an embodiment of the present disclosure.

Turning now to FIG. 3, a flow chart is shown for a method 300 for failure point diagnostics in cable telemetry, in a system such as that shown in FIG. 2. The method begins with generating 350 a plurality of test signals. In an embodiment, the method can begin automatically or, for example, based on reaching a threshold head voltage, or can be started manually by a user at the surface computer 234. A test signal may include, for example, a downlink command with a known bit content that travels a round trip on a test loop. A downlink test signal may be used, for example, for toolbus master diagnostics or interface package diagnostics. A test signal may include an electrical signal passed to and/or through a component, such as a multi-chip module, to test whether the component is functional and properly installed, or calls for replacement or repair.

The method continues with sequentially applying 352 the test signals across one or more test loops in the cable telemetry system. By sequentially, what is meant is that each component in the loop is tested in isolation from testing of other components; however, the test signals may in fact be applied simultaneously or near simultaneously in time.

The method continues with generating 354 a failure point alert when one of the test signals fails in one of the test loops, where the failure point alert identifies which component is the origin of the test signal failure. The types of failures that can be detected may include, but are not limited to, lack of power or memory in the surface computer 234, a port conflict for the surface acquisition front-end unit due to modules not being properly installed or connected or modules running in safe mode, bad physical connections, cable length that is too short, insufficient cable insulation, short or open circuits, hardware failures, measurement failures, hardware running an outdated version of firmware, cable propagation mode failure, signal-to-noise ratio exceeding a given threshold, cable trim failure, tool initialization failure, mismatch in toolstring, topology, full data buffers, broken boards, attenuation on cable exceeding a threshold, and the like.

The method continues with displaying 356 the failure point alert in real time. The results can be displayed on a window on the surface computer 234. Alternatively or additionally, a detailed report can be logged 358 for initial auto-diagnosis phase and successive diagnosis sessions run by user. In an embodiment, the failure point alert may also indicate a type of failure at the identified component.

In an embodiment, a first test loop of the one or more test loops can include a signal loop internal to the surface acquisition front end to diagnose the components thereof. This type of test loop may also be referred to as a surface acquisition front-end self-test. Each module in the surface acquisition front-end unit (such as power module 221, TIM 222, depth and tension module 223, FEPC 224) can be diagnosed using internal test loops to confirm that the module hardware is functioning properly. In an embodiment, the tests may be executed on each module as soon as the surface acquisition front-end unit 119 is turned on. In an embodiment, a user may manually execute the tests. Each module of the surface acquisition front-end unit 119 may also be equipped with a 'test harness' which allows for testing of each module outside the surface acquisition front-end unit 119 and is used during manufacturing or testing. The test harness also has additional capabilities for measuring/injecting electrical signals to allow the module hardware to be fully tested.

In an embodiment, a second test loop of the one or more test loops can include a signal loop making a round trip over the length of the cable. This type of test loop may also be referred to as a "logging cable test".

When packets, such as cable link packets for uplink, superpackets for downlink, are transmitted on the cable 114, a cyclic-redundancy-check (CRC) word may be added to each packet to function as a checksum. During reception, the receiving device (e.g., either the DTM 220 or DTC 226) re-computes the CRC word from the packet data and compares the re-computed CRC word with the received CRC word. As signal attenuation and/or noise may occur on the cable telemetry physical layer, one or more bits in the packet can be in error, the receiving device can detect the mismatch between the calculated CRC word and the received CRC word, and the mismatch may be indicative of a failure on the cable 114. In addition to testing the data layer of the cable, the physical layer of the cable may be diagnosed by measuring resistance on wires (e.g., 2, 6, 3 and 5 for T5 propagation mode on heptacable), and estimating the head voltage on wires (e.g., 1 and 4), the results of which can be indicative of open cable or bad insulation on the cable.

Special test uplink messages can be generated in the TIM 222 of the surface acquisition front-end unit 119 and in the DTC 226, and sent to the surface computer 234 for display/recording. For uplink and downlink, indicators can be displayed, for example, signal-to-noise ratio (SNR) and SNR margin statistics, signal strength measurements, pilot synchronization measurements, and processor loading in both surface and downhole modems. These indicators can provide, at a glance, differences between actual link quality and required quality for reliable operation. During data transmission, both uplink and downlink portions of the cable telemetry modems monitor the signal-to-noise ratio (SNR) on each subcarrier. Through a process referred to as "bit swapping," the distribution of data rate across subcarriers can move from subcarriers with insufficient SNR to those with extra SNR with the purpose of flattening a quantity known as SNR margin. SNR margin is the difference between the actual SNR measured and the required SNR for the data rate carried by a particular subcarrier. By ensuring that each subcarrier has a similar margin, the bit-error rate of the physical layer may, in an embodiment, be minimized.

In an embodiment, the test loop may route between the toolbus master node controller 227 and surface computer 234 for evaluation of the cable data layer. In the test loop, the surface computer 234 may send a downlink command to the toolbus master node controller 227 to request performing various tests, and returning the results to the surface computer 234. The tests run by the toolbus master node controller 227 may involve: downlink ramp test, loopback, and uplink ramp test.

In a downlink ramp test, the surface computer 234 sends predefined ramp data (for example, an array of sequential numbers) to the toolbus master node controller 227, the toolbus master node controller 227 checks the received data for errors, and reports the result to surface computer 234, thereby identifying any failure on the downlink path from surface to downhole.

In a loopback test, the surface computer 234 sends loopback data to the toolbus master node controller 227. In an example, the loopback data may be an array of sequential numbers. After the toolbus master node controller 227 receives loopback data, it sends data back to surface computer 234. A surface application 238 compares the received loopback data with original loopback data, thereby identifying failures (i.e., mismatches) on both the downlink and uplink paths.

In a ramp test, the toolbus master node controller 227 sends the predefined ramp data to surface computer 234. The surface computer 234 compares the received data with an expected ramp data file, thereby identifying any failure or mismatch on the uplink path from surface to downhole.

In an embodiment, a third test loop of the one or more test loops can include a signal loop making a round trip over the toolbus. The toolbus test loop can be used to troubleshoot intermittent tool failures or to evaluate tool downlink and uplink performance (i.e., link between each individual tool 230 and DTC 226).

A stress test may be performed between the master node controller 227 and interface packages 232 hosted in each of the tools 230, 230', etc. Either the surface computer 234 or toolbus master node controller 227 may command one or more tools to run a downlink ramp test, an uplink ramp test, a loopback test, or combinations thereof, to produce test results. The master node controller 227 may receive the test data with results for each tool 230 in the string, check for bit errors, and report results to the surface tool applications 238. In such a test, the test loop could be defined as from a surface tool application 238 on the surface computer 234 or the toolbus master node controller 227 downlinked across the cable 114 and/or toolbus 228 to each interface package 232 of each tool 230, and looped back to the starting point along the same path.

At the surface, a number of tools, including legacy tools with varying generations of interface packages, can be selected in the user interface of the surface computer 234 to represent the actual tool string. The stress test described above thus may use loopback testing to identify a failing tool, referred to as tool #1, nearest to the master node controller 227.

Tool #1 (selected as the tool in first position of the tool string and closest to master node controller 227) can be enabled first and a stress test performed. If tool #1 passes, each of other tools can be enabled and tested one-by-one: master node controller 227 with tool #1 and tool #2 are enabled, and the stress test conducted again, and so on.

A failing tool is identified during the first stress test conducted in which the tool is included in the test loop where the test results are not above a predetermined threshold. In such a stress test, the test loop could be defined as extending from the master node controller 227 to each interface package 232 of each tool 230, and looped back to the starting point along the same path along the toolbus 228. In an embodiment, the stress test could start from the surface computer 234 or at the master node controller 227.

Another test that may be performed in a loop routing between the master node controller 227 and the interface packages 232 of each tool. A failing tool is identified if no communication can be established during the test signal instance in which the failing tool is included in the test loop. Communications with or between the tools of the downhole tool string 116 are reported by the master node controller 227 to the corresponding surface tool application 238 for the specific tool. In an embodiment, the stress test can either start from the surface computer 234 or from the master node controller 227. In an embodiment, a fourth test loop of the one or more test loops can include a signal loop internal to the downhole controller modem.

Figure 4:
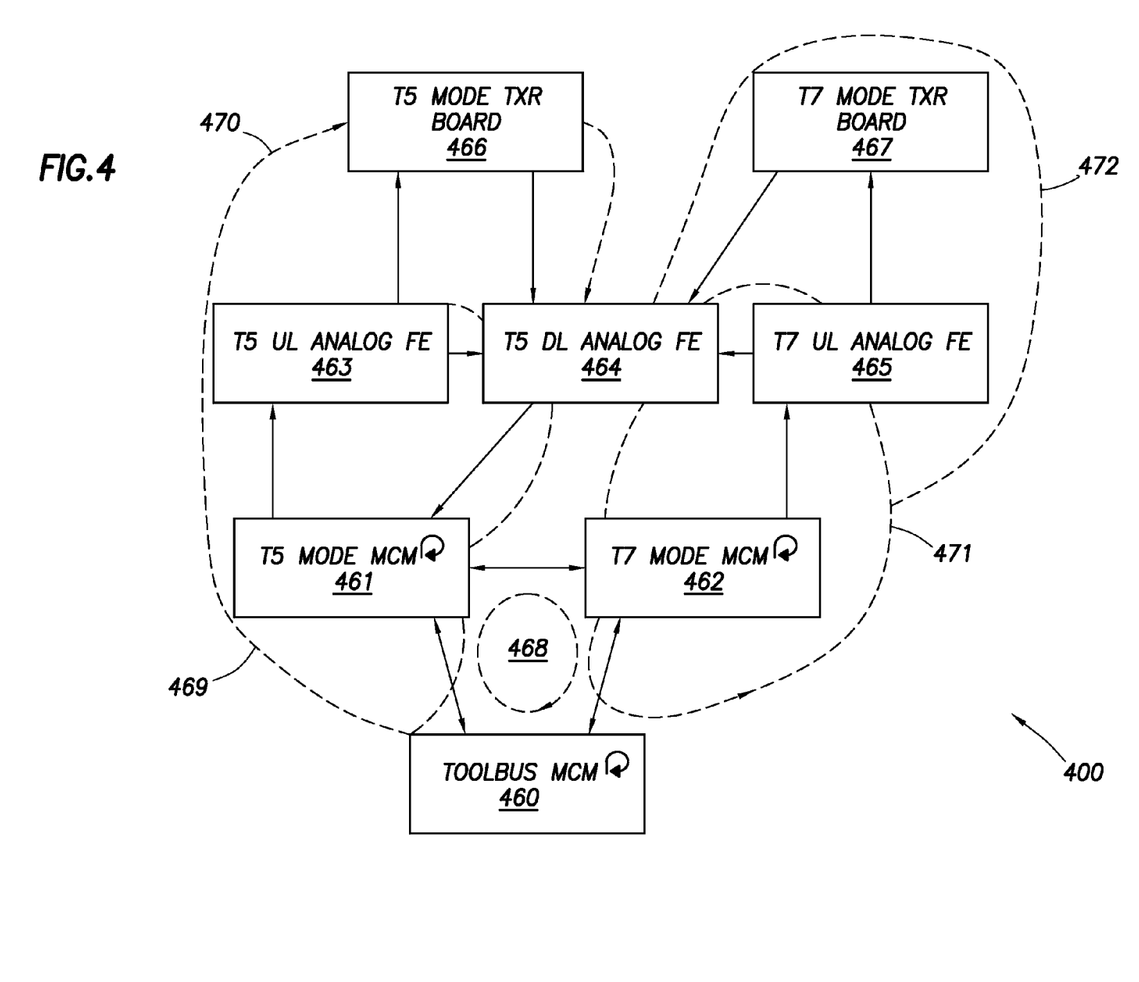
FIG. 4 is a schematic diagram illustrating test loops for a downhole modem in accordance with an embodiment of the present disclosure.

FIG. 4 shows a block diagram of a test loop coverage 400. In this example, the test loop coverage 400 includes test signal paths which are circuits physically present on one or more boards, electrically open circuited at default, and closed circuited when running diagnostics tests for testing whether electronic components in each block are working properly. For example, a signal path may loop internally in a toolbus multi-chip module (MCM) 460 for the toolbus master node controller 227, as well as another signal path looping internally in a MCM for T5 propagation mode MCM and T7 propagation mode MCM. MCM are components of the toolbus master node controller for controlling signal generation in each propagation mode along the cable, as described in related U.S. Patent Application Publication No. 2014-0152459 A1, to A. Olson et al., filed on Dec. 4, 2012, and entitled "Wellsite System and Method for Multiple Carrier Frequency, Half Duplex Cable Telemetry".

For the T5 mode, a test loop 470 can be defined as starting at the toolbus MCM 460, to a T5 propagation mode MCM 461, to a T5 uplink analog front end 463, to a T5 propagation mode transceiver board 466, to a T5 downlink analog front end 464, to the T5 propagation mode MCM 461, and back to the toolbus MCM 460.

For the T7 mode, a test loop 472 can be defined as starting at the toolbus MCM 460, to a T7 propagation mode MCM 462, to a T7 uplink analog front end 465, to a T7 propagation mode transceiver board 467, (due to downlinks not being transmitted in T5 mode) to the T5 downlink analog front end 464, to the T5 propagation mode MCM 461, and back to the toolbus MCM 460.

Another test loop 469 may be defined as starting at the toolbus MCM 460, to the T5 propagation mode MCM 461, to the T5 uplink analog front end 463, to the T5 downlink analog front end 464, to the T5 propagation mode MCM 461, and back to the toolbus MCM 460.

Still another test loop 471 may be defined as starting at the toolbus MCM 460, to the T7 propagation mode MCM 462, to the T7 uplink analog front end 465, (due to downlinks not being transmitted in T5 mode) to the T5 downlink analog front end 464, to the T5 propagation mode MCM 461, and back to the toolbus MCM 460. Any of the signal test loops may be used in testing each of the modules (i.e., boards) of the downhole modem to identify when, and optionally which, one has failed.

While example test loops have been described above, the present disclosure is not limited to the particular example test loops described, as additional test loops are identifiable by one of ordinary skill in the art, for example, to check the communication between the T5 propagation mode MCM 461 and the T7 propagation mode MCM 462, between the T5 propagation mode MCM 461 and the toolbus MCM 460, between the T7 propagation mode MCM 462 and the toolbus MCM 460, etc.

Returning now to FIG. 3, the method 300 can continue with repeating applying the test signals across the one or more test loops during operation of the cable telemetry system, and generating failure point alerts which are logged or displayed for a plurality of points in time during operation of the cable telemetry system.

For the cable, various indicators may be displayed, such as, for example, CRC error statistics or SNR measurements, buffer overflow indicators. For the surface acquisition front end, indicators for failed particular modules may be displayed. For the toolbus data layer, error rate of uplink and downlink transmissions may be displayed, as well as synchronization accuracy information as per between each node, and the surface and downhole modems DTM 220 and DTC 226.

For the DTC 226, uplink and downlink CRC error, uplink and downlink decoder error per tool, uplink packet incomplete error, uplink and downlink re-transmission count, digital signaling processor (DSP) load percentage, and uplink superpacket buffer usage may be optionally displayed. The following occurrences can also be displayed to the user to indicate a failing part of the system: overflow of the downlink command buffer, overflow of the uplink superpacket buffer, overflow of a node uplink buffer, timestamp error by/at the toolbus master, etc. When these error indicators are observed, engineers can take corrective actions.

Figure 5:
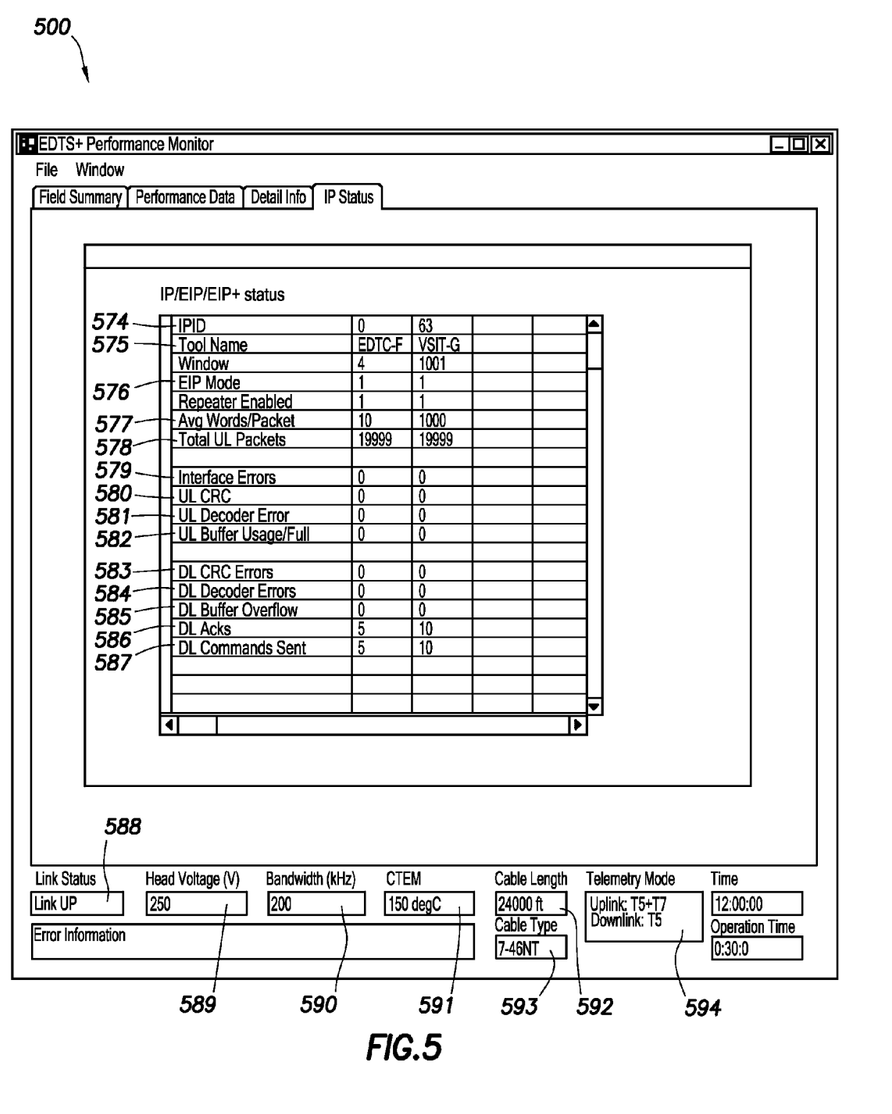
FIG. 5 is a schematic diagram illustrating an example failure point alert in accordance with an embodiment of the present disclosure.

FIG. 5 shows an example failure point alert 500 that could be generated at the surface computer 234, in accordance with an embodiment of the present disclosure, for a particular tool. Shown in the failure alert window is a tool identifier 574 and tool name 575, generation 576 (i.e., interface package mode) of the interface package for the particular tool, average words/packet 577 and total uplinked packets 578 from the particular tool.

The results of the tests can be seen, showing zero interface errors 579, an uplink CRC 580, the number of uplink decoder errors 581, the number of times the uplink buffer overflowed 582, the number of downlink CRC errors 583, the number of downlink decoder errors 584, the number of times downlink buffer overflowed 585, the number of downlink acknowledgements 586, and the number of downlink commands sent 587.

As shown in FIG. 5, the failure alert window can also show at a glance for the entire cable telemetry system the telemetry link status 588, measured head voltage 589, the communication bandwidth 590, downhole environment temperature 591, cable length 592 and type 593, and propagation mode 594. Each of the indicators shown in the example failure alert window can be used to indicate a failure point in the cable telemetry system.

The diagnostic tests, as described above, can be applied while the cable telemetry system is in use in a well, or while not in use (i.e., for example on a shop floor) using an emulator. While many types of hardware failure may not directly impact cable telemetry, some types of failures of diagnostic tests indicate equipment that cannot be used in many circumstances. Any faulty modules can be replaced or repaired. Other types of failures may indicate some intervention by the user (i.e., field engineer) to repair, reconnect, reorder, or otherwise impact one or more components in the system.

Failure Point Diagnostics in Cable Telemetry Explanation

As referred to herein, failure diagnostics are meant to assist the field engineer with troubleshooting of telemetry systems by testing components separately in order to detect the origin and type of failure. Failure diagnostics (e.g., EDTS 2.0) can be divided into eWAFE self-tests (i.e, detecting eWAFE module failures), logging cable tests facilitated by eWAFE and Enhanced Digital Telemetry Cartridge (EDTC-H)—detecting if wires of the multiconductor cable have a failure, EDTC-H self-tests—hardware health checks normally performed before the telemetry training starts, and EFTB 2.0 toolbus self-tests. The tests can further narrow the source of a problem to a particular tool in the tool string. The results are displayed on a screen (e.g., MAXWELL™ window). A detailed report can be logged for initial auto-diagnosis phase and successive diagnosis sessions run by user.

Link performance monitoring and management (e.g., using EDTS 2.0) provides detailed monitoring of both cable telemetry link quality, as well as toolbus link quality using, for example, uplink and downlink cable telemetry physical layer performance indicators, cable telemetry data layer performance indicators, and toolbus data layer performance indicators.

Certain test uplink messages are generated in the TIM of eWAFE, and in the Enhanced Digital Telemetry Cartridge (e.g., EDTC 2.0), and sent to MAXWELL™ framework for display/recording. In terms of performance management, the telemetry link is maintained without user intervention (when possible). Toolbus and cable telemetry performance indicators can be recorded in separate files and assist with later failure analysis/investigation.

Figure 6:
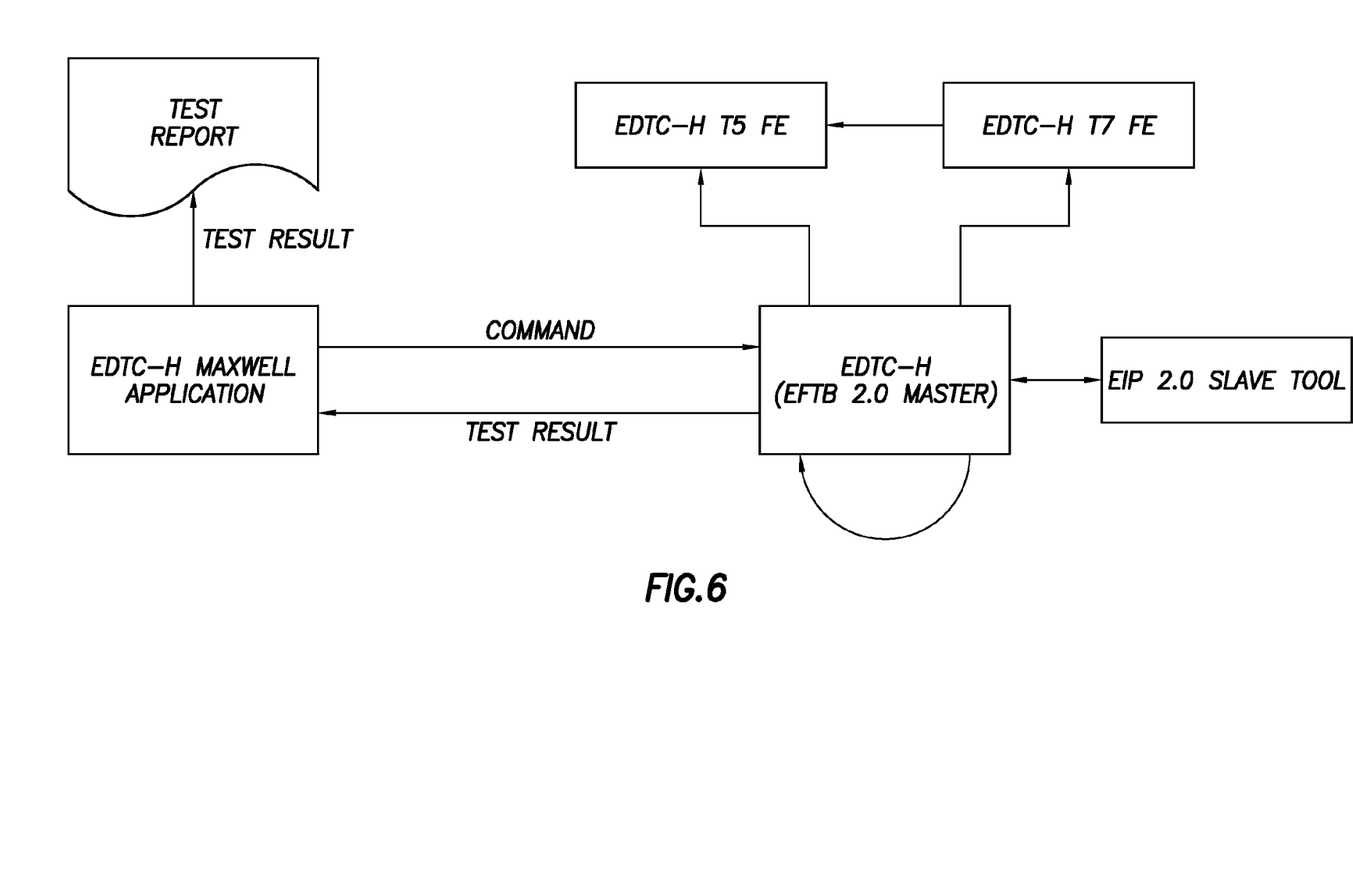
FIG. 6 is a schematic diagram illustrating a cable telemetry system in accordance with an embodiment of the present disclosure.

FIG. 6 shows an embodiment of a cable telemetry system using EDTS 2.0. The system includes an EIP 2.0 slave tool coupled to an EDTC-H (EFTB 2.0) master. The master is in communication with EDTCH T5 FE and EDTC-H T7 FE. EDTC-H T7 FE communicates with EDTC-H T5 FE. The master is also in bidirectional communication with an EDTC-H MAXWELL™ application for sending test results and receiving commands. The test results are passed from the application to a test report module for reporting.

The EDTS 2.0 cable telemetry is the firmware supporting the telemetry system and hosted and run by the TIM residing in the eWAFE system. EDTS 2.0 firmware is run at both TIM and EDTC-H. EDTC-H communicates with both tools below it and TIM at surface. The EDTS 2.0 can include the EDTC-H: This is the downhole telemetry cartridge that communicates with the tools. The EDTS 2.0 can include the Enhanced Fast Tool Bus EFTB 2.0: This is an embodiment of a downhole telemetry bus with increased data communication capacity. This includes the development of the Enhanced Interface Package (EIP) 2.0 application. The EDTS 2.0 can include the MAXWELL™ framework: This software allows the configuration, control and data acquisition with EDTS 2.0. The surface acquisition software MAXWELL™, the eWAFE, the logging cable and head, the telemetry cartridge (e.g., EDTC-H) and the tools in the toolstring may be checked to verify good working condition.

Figure 7:
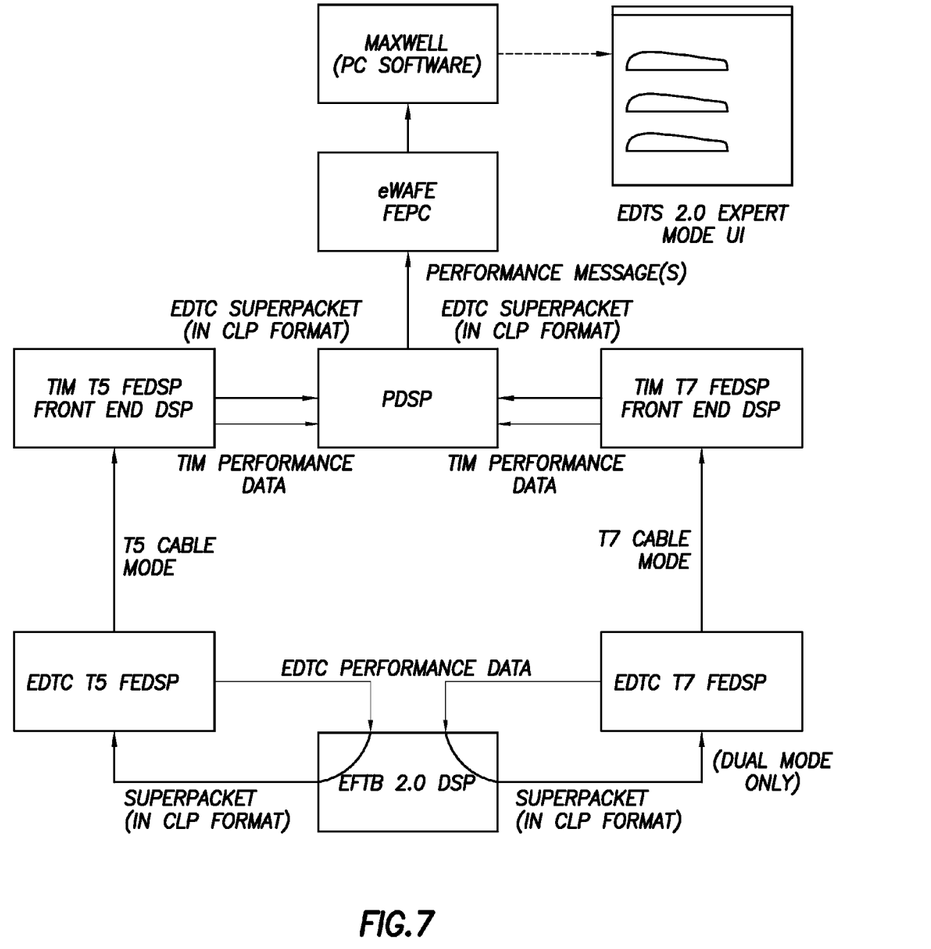
FIG. 7 is a schematic flow diagram illustrating a failure diagnostics system in accordance with an embodiment of the present disclosure.

FIG. 7 depicts a sample test configuration for an embodiment of the failure diagnostics system. The test configuration includes an EFTB 2.0 DSP sending superpackets in CLP format to EDTC T5 front-end DSP (FEDSP) and EDTC T7 FEDSP (in dual mode). From the EDTC T5 FEDSP communicates via T5 cable mode to TIM T5 FEDSP front-end DSP. TIM performance data is sent in EDTC superpackets in CLP format on to PDSP. From the EDTC T7 FEDSP communicates via T7 cable mode to TIM T5 FEDSP front-end DSP. TIM performance data is sent in EDTC superpackets in CLP format on to PDSP. From PDSP, performance messages are sent to eWAFE FEPC, on to MAXWELL™ PC software, and on to EDTS 2.0 expert mode user interface.

As shown in the example of FIG. 7, tests can be run on the system while the system is in the well or on the shop floor. For example, a toolstring containing a tool EIP 2.0 could run the EFTB 2.0 toolbus self-test when EDTC-H is present and the telemetry link is up, or when an EFTB 2.0 emulator is used to connect the toolstring to the PC. In a similar fashion EDTC-H self-tests can be run when EDTC-H is connected to the logging cable and the telemetry link is up, or it can be run on the bench with the help of emulator cables and tools. When the telemetry link is up, the tests can run automatically in an embodiment or user-driven in another embodiment from MAXWELL™ with the results being sent uphole by the telemetry cartridge and then processed in MAXWELL™.

Each eWAFE module, such as the TIM, the Power Distribution Interface Module (PDIM), the Depth and Tension Interface Module (DTIM), and the Universal Power Modules (UPMs), contains internal diagnostics tests. These tests check that the module hardware is functioning properly. These tests may be executed by each module as soon as the eWAFE system is turned on. These tests can also be executed manually by the user. Each eWAFE module also has a 'test harness' which allows for testing of the module outside the eWAFE system and is used during manufacturing testing. The test harness also has additional capabilities for measuring/injecting signals that allow the module hardware to be even more fully tested than what is possible when the module is inside the eWAFE system. The test harness also has a benefit that it does not require the module to be opened.

The individual module diagnostics can be, in an embodiment, accessed through a webpage via a web browser. The module diagnostics may check for many types of hardware failures. Some types of failures may not be detectable by a single module in isolation. The eWAFE system-level diagnostic tests are another set of tests executed from the computer (e.g., PC). These tests exercise system functionalities that may involve coordination of multiple modules and/or the PC.

While many types of hardware failure may not directly impact cable telemetry, eWAFE hardware that fails diagnostic tests may not be usable in various circumstances. Detected faulty modules can be replaced. When a module fails power-up diagnostic tests, it goes into a mode known as 'safe mode'. In 'safe mode', the module cannot connect to MAXWELL™ and displays information about the failure on its webpage.

The eWAFE uses cable trim to measure the resistance on wires (e.g., 2, 6, 3 and 5 in T5 mode) and to estimate head voltage (e.g., ACMAIN on wires 1 and 4). This estimate has greater than ±10% accuracy and may be used preliminarily until display of the actual downhole head voltage which is available after cable training. A cable trim detection scheme implemented in eWAFE can detect cable open or bad insulation issues (e.g., for wires 2, 3, 5 and 6).

This self-test can be performed by executing firmware on the FEDSP hosted in EDTC-H, and can allow the diagnosis of EDTC-H component failures intra MCMs, interface failures inter MCMs, uplink and downlink analog front-end subassembly failures including transmitter/receiver board failures (XMTR/RCVR).

Figure 8:
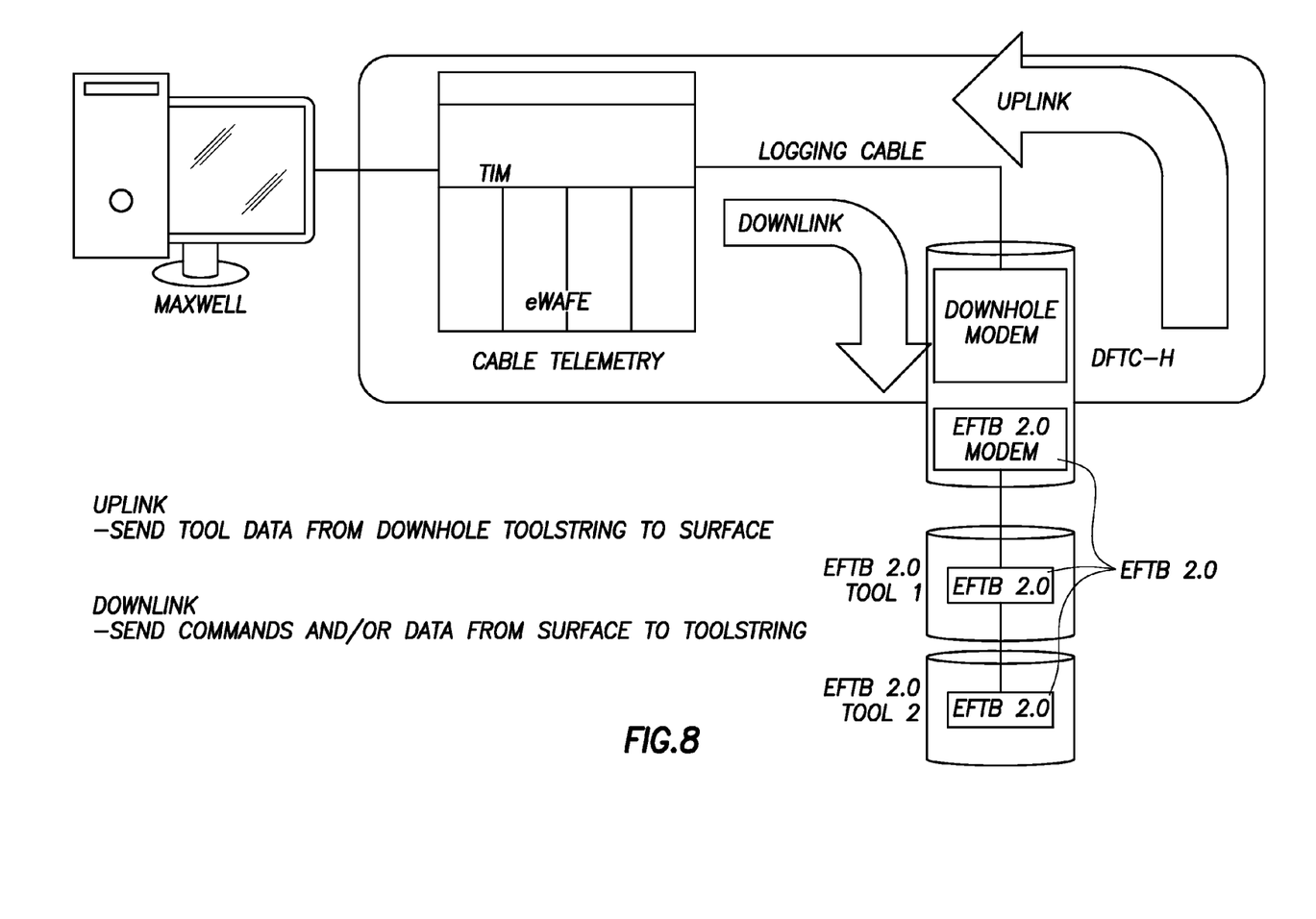
FIG. 8 is a schematic diagram illustrating a test loop for a cable telemetry system in accordance with an embodiment of the present disclosure.

FIG. 8 shows an example telemetry system depicting uplink and downlink communication therethrough. Data transfers between a MAXWELL™ tool application, an uphole modem, a downhole modem and a tool. The communication between the MAXWELL™ tool application and an uphole modem and the communication between the downhole modem and the tool involve uplink data and commands. The communication between the uphole modem and the downhole modem involves modem signals (cable telemetry). The cable telemetry may provide delivery from uphole to downhole modem only. The EDTS 2.0 components may be used to provide delivery from MAXWELL™ tool application to tool.

FIG. 8 also depicts EDTC-H test coverage where "Test Signal Paths" are physically on board, electrically open circuited at default, and closed circuited when running diagnostics tests for testing whether electronic components in each block are working properly. If the test is run on the bench without the logging cable or the telemetry link being up, the user can remove EDTC-H housing, connect an emulator tool head to the EDTC-H, and connect EDTC-H serial port and a PC serial port (RS-232). The PC can be provided with a user friendly graphics user interface (GUI) or standard terminal software.

The tool bus diagnostic test can be run repeatedly during operation. The test can be performed from MAXWELL™ and test reports are made available to users at the end of tests. The test is performed after confirmation that the toolbus master in EDTC-H is operational.

Figure 9:
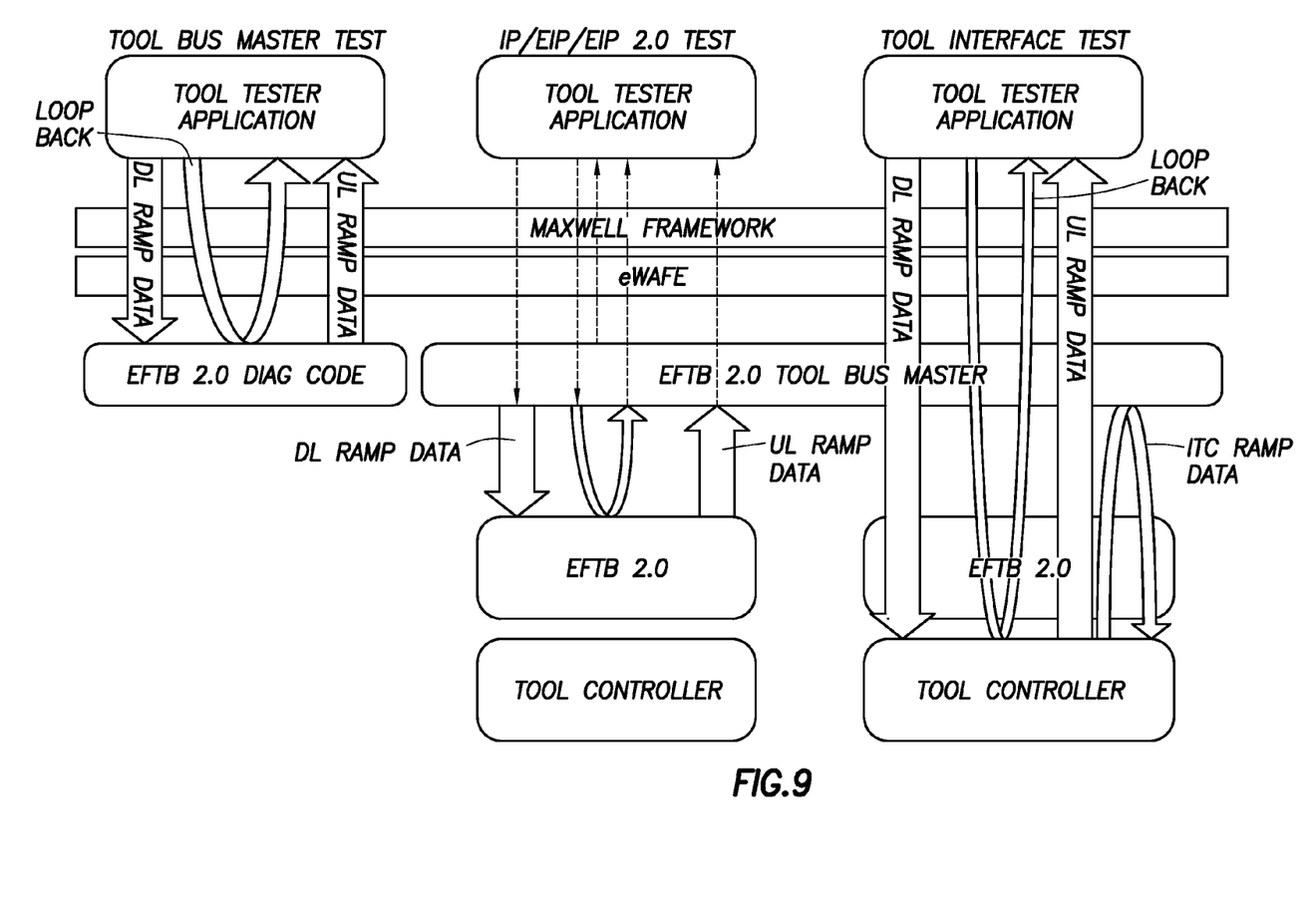
FIG. 9 is a schematic diagram illustrating three diagnostic tests in accordance with an embodiment of the present disclosure.

The toolbus master of a telemetry system (e.g., EFTB 2.0) can support three tests shown in FIG. 9. Each of the three tests relates to the toolbus or tool, and may be used to identify a failing toolbus or tool. These tests may also be used to ensure that parts of the toolstring can deliver communication for the duration of a job. The three tests include tool tester applications communicating with various components through MAXWELL™ framework and eWAFE.

Figure 10:
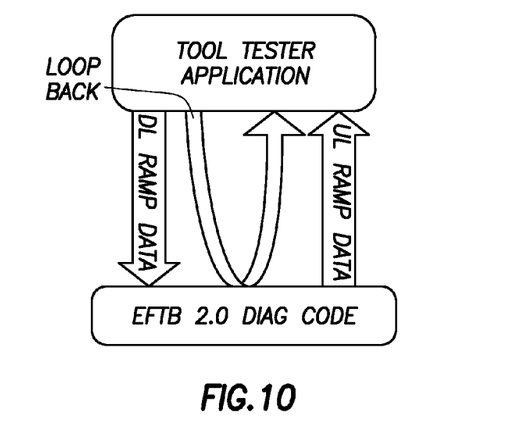
FIG. 10 is a schematic diagram illustrating another diagnostic test in accordance with an embodiment of the present disclosure.

In the first test on the left, a toolbus master test involves passing downlink ramp data to and receiving uplink ramp data from an EFTB 2.0 diagnostic code and performing a loopback therebetween. A toolbus master test is shown in the block diagram of FIG. 10. The toolbus master test is performed between a tool tester application at the surface (e.g., MAXWELL™) and a toolbus master (e.g., EFTB) hosted in EDTC-H. The toolbus master test may be used to help troubleshoot failures between the surface application and the EFTB master.

Downlink commands are sent from the surface to the EFTB 2.0 master to request performing tests. The tests covered may include, for example, downlink ramp test, loopback, and uplink ramp test. The tool tester application may be used to prepare and check the ramp/loopback data.

In downlink, a ramp test sends predefined ramp data to the EFTB master, and the EFTB master checks the received data and reports the result to surface. The downlink ramp test helps to identify the failure on the downlink path from surface to downhole.

In the loopback test, loopback data is sent to the EFTB master. After the EFTB master receives loopback data, it sends data back to surface. The surface application compares the received loopback data with original loopback data. This test can identify the failures on both the downlink and uplink paths.

In an uplink ramp test, the EFTB master sends the predefined ramp data to surface. The surface compares the received data with the expected ramp data. The uplink ramp test helps to identify the issues on the uplink path from downhole to surface.

Referring back to FIG. 9, in the second test in the middle, an IP/EIP/EPI 2.0 test involves passing downlink ramp data through the EFTB toolbus master to and receiving uplink ramp data from EPI 2.0 and performing a loopback therebetween. The IP/EIP/EIP 2.0 test can be used to troubleshoot intermittent tool failures or to evaluate tool downlink and uplink performance. In the third test on the right, a tool interface test involves passing downlink ramp data through the EFTB tool bus to and receiving uplink ramp data from an EFTB 2.0 and a tool controller, and performing a loopback therebetween. A second loop can be performed in the third test between the tool controller and the toolbus master using ITC ramp data.

The stress test is performed between the toolbus master hosted in EDTC-H and interface packages (EIP 2.0) hosted in the tools. For this test, any number of tool applications can be selected in MAXWELL™ setup console. The MAXWELL™ or toolbus master commands the selected tools (not limited to one tool) to run downlink ramp test, uplink ramp test or loopback test, that is, to produce test data. In an embodiment, the loopback data may include an array of sequential numbers. The toolbus master hosted in EDTC-H receives the ramp/loopback test data from the selected tools, check for bit errors, and reports the results to the corresponding tool tester applications.

At the surface, a number of tools, including legacy tools, can be selected and combined in MAXWELL™, hopefully according to the actual tool string. The toolbus diagnostic identifies a failing tool nearest to EDTC-H by loopback testing. That is, the tool #1 (selected as the tool in first position of the tool string and closest to EDTC-H in MAXWELL™) is enabled first and tests are run. If the first tool passes, the other tools are enabled and tested one-by-one: EDTC-H with tool #1+tool #2 (selected as the tools in first and second positions in the tool string in MAXWELL™) are enabled and tests are carried out again, and so on. A failing tool is then identified eventually once the failing tool is included in the test loop.

The IP/EIP/EIP 2.0 test is performed between the toolbus master hosted in EDTC-H and interface packages (IP/EIP/EIP 2.0) hosted in the tools: a failing tool is identified if no communication can be established once the failing tool is included in the test loop. Communications with the tools are reported by the toolbus master to the corresponding tool tester applications (a tool specific add-on to the MAXWELL™ framework).

Tool interface test can be used to troubleshoot interface between the tool applications and the corresponding tools. The tool interface test combines the two previous tests, with the addition that the toolbus master now works in normal transmission mode: it may not generate commands or check data, but may transmit commands to and data from the tools. Commands are now generated from the tool tester applications, and data are checked by the tool tester applications.

Link performance monitoring and management provides detailed monitoring of cable telemetry link quality and toolbus link quality using uplink and downlink cable telemetry physical layer performance indicators, cable telemetry data layer performance indicators, toolbus data layer performance indicators.

Special uplink messages are generated in the TIM of eWAFE, and in the EDTC H, and sent to MAXWELL™ framework for display/recording. In terms of performance management, the telemetry link is maintained without user intervention (when possible). Tool bus and cable telemetry performance indicators can be recorded in separate files and assist with later failure analysis/investigation.

Cable telemetry physical layer performance indicators and management can be displayed such as SNR and SNR margin statistics, signal strength measurements, pilot synchronization measurements, and processor loading in both surface and downhole modems. These indicators can provide visuals of the difference between the actual link quality and the required quality for reliable operation.

During data transmission, both uplink and downlink portions of the cable telemetry modems monitor the SNR on each subcarrier. Through a process named 'bit swapping', the distribution of data rate across subcarriers can move from subcarriers with insufficient SNR to those with extra SNR with the purpose of flattening a quantity known as SNR 'margin.' SNR margin is the difference between the actual SNR measured and the required SNR (for the data rate carried by a particular subcarrier). By ensuring that various subcarriers have similar 'margin', the bit-error rate of the physical layer is minimized.

Both a rough and a fine signal strength measurement may be performed. The rough measurement is performed by emitting a pilot tone on one of the subcarrier. For example, the pilot tone may be transmitted at the same average power as the discrete multi-tone modulation signal. This is a rough measurement because it does not take the complete channel frequency response into account. The fine measurement is performed by computing the time-domain variance of the received signal using frequency-domain fast Fourier transform outputs and Parceval's theorem, other than DC transform. During data transmission, receiver gains may be adjusted based on the signal strength measurements, for example to avoid clipping.

In another signal strength measurement, four normalized tones are emitted on four selected subcarriers. The measurement may be used to monitor the high frequency attenuation caused by longer cables and/or well temperature. During data transmission, the system may reduce the signal bandwidth (for example from 250 KHz to 200 KHz) if or when high frequency tones are more attenuated than low frequency tones.

Pilot synchronization is performed by emitting a pilot signal on one of the subcarriers, and measuring/updating the number of clock pulses (of a division thereof) between two zero crossing of the pilot. A pilot reference is then computed using an average of the number of clock pulses. Subsequent shift angle is computed from the dot product of the pilot tone and the conjugate of the pilot reference.

During data acquisition, as the frequency of downhole clocks drifts with temperature, the drift may be accounted for. A counter accumulates the net sign (positive or negative) of each phase shift measured where the shift angle is above a threshold. Sampling re-synchronization may be performed during a quiet time if or when the value of the counter is too large.

When packets (cable link packets for uplink, superpackets for downlink) are transmitted on the cable, a CRC word is added to each packet. The CRC word functions as a checksum. During reception, the receiver re-computes the CRC word from the packet data and compares with the received CRC word. As signal attenuation and/or noise may occur on the cable telemetry physical layer, one (or more, with limits) bits in the packet can be in error, and the receiver can detect the mismatch between the calculated CRC word and the received CRC word. Since this algorithm uses the CRC word, the event of detecting a packet in error is named a 'CRC error.'

The receiver can flag some packets as corrupted (having a CRC error). Lost or damaged packets may have to be retransmitted for reliable data delivery. As long as the packet error rate is below a particular threshold, the retransmission mechanism can function as designed (no data buffer overflow for example).

In terms of statistics, reporting the total number of CRC errors detected and the total number of packets provides metrics by which the link quality can be evaluated. Although there is a relationship between SNR and packet error rate, some forms of interference (such as intermittent noise) may not affect SNR, but can cause a higher-than-expected packet error rate. Thus, both the CRC error statistics and the SNR measurements are valuable. When the measured packet error rate is high (for example, relative to a predetermined threshold), a warning light can be displayed to the user to indicate poor cable telemetry link quality.

Further, a theoretical value of the CRC error rate can be calculated as a function of the SNR conditions (e.g., the minimum uplink margin) and a size (e.g., the average size) of the packets being transmitted. EDTS 2.0 expert mode User Interface (UI) can display both the current packet error rate and the theoretical value of error rate. When the measured packet error rate is substantially higher than the maximum theoretical value of the packet error rate, it may indicate a fault in the system.

EDTS 2.0 transmitted packets are maintained in a memory buffer as long as confirmation of proper reception is received. EDTS 2.0 can also record the occurrences of buffer resets caused by the buffer overflow.

Figure 11:
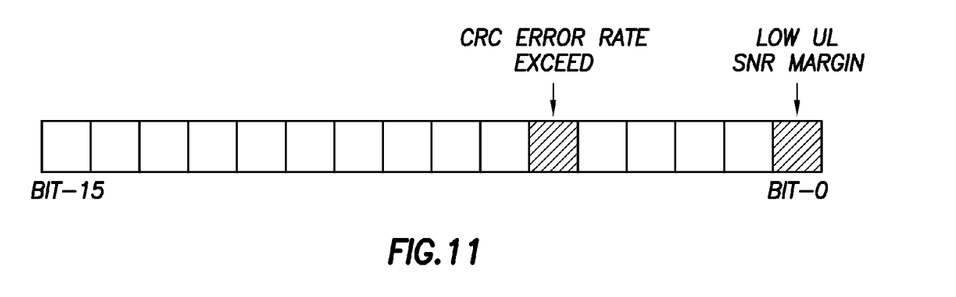
FIG. 11 is a schematic diagram illustrating a coded word that may be displayed as a failure alert in accordance with an embodiment of the present disclosure.

As shown, for example, in FIG. 11, MAXWELL™ can display cable telemetry performance information by using, for example, a 16-bit coded word where each bit can be set to an alert value when an attention is required by user, such as low uplink or downlink SNR margin or CRC error rate exceed expected threshold. The 16 bit coded word is depicted as 16 blocks in a horizontal row. The 16 blocks extend from a BIT-15 from the left to a BIT-0 on the right. A CRC error rate is exceeded as depicted in a shaded block (6 blocks from the right). A low uplink SNR margin is detected in the shaded BIT-0 block (at the far right).

Such information can be recorded in the system log file. For example, in an embodiment, a bit could be changed in color, or an indicator on a scale, an intensity of a display, or other indicia.

Toolbus data layer performance indicators can be displayed to the user to indicate the toolbus data transmission quality. The indicators can include error rate of uplink and downlink transmission. Synchronization accuracy of clocks, such as the slave clock or EIP 2.0 clock, may be provided per node. The synchronization accuracy can be evaluated with maximum and average values of clock offset and timing distortion, or jitter. Various statistics can be displayed optionally. The statistics may be useful to the user for checking the toolbus status. Such statistics can include uplink and downlink CRC error, uplink and downlink decoder error, uplink packet incomplete error, uplink and downlink re-transmission count, DSP load percentage, and uplink superpacket buffer usage.

Error indicators can be displayed to the user to indicate a failing part of the system. The error indicators may include overflow of the downlink command buffer, overflow of the uplink superpacket buffer, overflow of a node uplink buffer, timestamp error by or at the toolbus master. When these error indicators are observed, engineers can take corrective actions.

MAXWELL™ collects and displays error counts and other statistics in the EDTS 2.0 expert mode GUI using the telemetry cartridge message and the 'Superpacket Status' message. These displays include both the toolbus transmission related errors from the superpacket status message as well as errors or statistics on EDTC-H toolbus master operation, such as buffer usage, retransmission, etc.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system for failure point diagnostics in cable telemetry at a wellsite, comprising:
    a cable defining a first round trip test loop, operatively coupling between a surface modem, comprising a first internal test loop, and a downlink modem, comprising a second internal test loop, that is operatively coupled to a downhole toolstring of one or more downhole tools via a toolbus defining a second round trip test loop;
    a surface computer, operatively coupled to the surface modem, that generates a plurality of surface test signals;
    a surface acquisition front-end, operatively coupled to the surface computer, that comprises a third internal test loop;
    wherein the surface computer is configured to sequentially apply the plurality of test signals across the first, second and third internal test loops and generate a failure point alert when at least one of the plurality of test signals fails in at least one of the test loops identifying which component of the cable telemetry system caused the test signal to fail, and
    wherein the failure point alert further indicates a type of hardware failure at the surface acquisition front-end that caused the test signal to fail.

2. The system according to claim 1, wherein the surface computer generates a failure point alert when one of the plurality of test signals fails in one of the first and second round trip test loops and the first, second, and third internal test loops indicating failure at one or more of the surface acquisition front-end, the cable, the downhole module, the toolbus, and at least one of the one or more downhole tools.

3. The system according to claim 1, wherein the surface computer further comprises an output module that displays the failure point alert.

4. The system according to claim 1, wherein the surface computer further comprises a log memory that stores the failure point alert.

5. The system according to claim 1, wherein the failure point alert further indicates a type of failure at the component of the cable telemetry system caused the test signal to fail.

6. A system for failure point diagnostics in cable telemetry at a wellsite, comprising:
    a cable defining a first round trip test loop, operatively coupling between a surface modem, comprising a first internal test loop, and a downhole modem, comprising a second internal test loop, that is operatively coupled to a downhole toolstring of one or more downhole tools via a toolbus defining a second round trip test loop;
    a surface computer, operatively coupled to the surface modem, that generates a plurality of surface test signals;
    a surface acquisition front-end, operatively coupled to the surface computer, that comprises a third internal test loop;
    wherein the surface computer is configured to sequentially apply the plurality of test signals across the first, second and third internal test loops and generate a failure point alert when at least one of the plurality of test signals fails in at least one of the test loops identifying which component of the cable telemetry system caused the test signal to fail, and
    wherein the third internal test loop includes surface test signal paths which are physically present on one or more circuit boards of the surface acquisition front-end, electrically open circuited at start-up, and closed circuited when receiving surface test signals, and used for generating a failure point alert when electronic component hardware in each circuit board is not functioning properly.

* * * * *